Patented June 12, 1951

2,556,575

UNITED STATES PATENT OFFICE 2,556,575

STABILIZED POLYMERIZED CHLOROPRENE LATEX CONTAINING ALUMINOUS CEMENT

Richard H. Cubberley, Ridgewood, and Charles E. Dill, Florham Park, N. J., assignors to the Patent and Licensing Corporation, New York, N. Y., a corporation of Massachusetts No Drawing. Application May 29, 1948, Serial No. 30,194

4 Claims. (Cl. 260—8)

This invention relates to a neoprene latex composition and more particularly to a stabilized neoprene latex adapted for use in the manufacture of flooring and coating compositions.

It has been proposed to make flooring compositions, coatings and the like by compounding aqueous dispersions of rubber or rubber-like materials with a fine mineral aggregate, such as sand, and a hydraulic binder or cement. In this type of composition it is desirable to use a dispersion in which the dispersed particles will remain satisfactorily dispersed throughout the mass without appreciable flocculation or agglomeration until the mass has been applied to the surface to be coated and has attained a rigid set. Attempts to make satisfactory compositions of the character indicated employing a neoprene latex as the aqueous dispersion component have heretofore generally met with difficulty. When Lumnite cement has been added to an ordinary neoprene latex in attempts to make a flooring and coating composition the Lumnite cement has caused the neoprene latex to "break," whereupon the dispersed neoprene particles agglomerate and make impossible the preparation of a satisfactory composition.

It is an object of this invention to provide a stabilized neoprene latex which will not break or agglomerate upon the addition thereto of Lumnite cement.

It is a further object of the invention to provide a stabilized neoprene latex composition suitable as a flooring or coating material.

Other objects and features of the invention will be apparent from the detailed description which follows.

According to the invention we provide a stabilized neoprene latex which comprises a neoprene latex containing, as stabilizing agents therefor, casein and a soap of a substantially petroleum-hydrocarbon insoluble pine wood resin. A neoprene latex to which relatively small quantities of these two stabilizing agents have been added in accordance with the invention is resistant to agglomeration or flocculation upon addition of Lumnite cement. We have found that these two agents, when employed in combination, have a stabilizing effect upon the neoprene latex not obtainable by the use of either agent alone. The combined effect of the casein and the pine wood resin soap is to maintain the particles of neoprene in dispersed form notwithstanding the presence of Lumnite cement and a finely divided filler in the latex. Thus, there may be prepared, a non-flocculated flooring or coating composition comprising sand or like filler, Lumnite cement and the stabilized neoprene latex of the invention.

Neoprene latex is an aqueous dispersion of particles of polymerized chloroprene (2-chlorobutadiene-1,3), and is a well-known article of commerce ordinarily prepared by the polymerization of emulsified chloroprene. The neoprene latex which may be stabilized in accordance with our invention may be prepared by any suitable process and the invention is not confined to a neoprene latex prepared in any particular manner. For use in the preparation of flooring and coating compositions the latex should preferably contain between 30 and 60% solids, and we have found a neoprene latex containing about 50% solids particularly effective.

Casein, which is a proteinaceous colloid, is preferably added to the latex as an alkaline caseinate, that is, dissolved in an aqueous solution of an alkali such as potassium hydroxide.

The pine wood resin which we employ in preparing the stabilized neoprene latex of the invention is known commercially by the trade name "Vinsol Resin." It is a substantially petroleum-hydrocarbon insoluble dark-colored resin having a melting point of about 115° C., an acid number of about 100 and a saponification number of about 140. "Vinsol Resin" may be defined as a liquid-paraffin-hydrocarbon-insoluble, aromatic-hydrocarbon-soluble resinous extract of pine wood. A "Vinsol Resin" soap is readily prepared by saponification of the resin with an alkaline hydroxide, e. g., sodium hydroxide or potassium hydroxide. Complete saponification can be effected without the application of heat.

Although we have found that only relatively small quantities of casein and "Vinsol Resin" soap are necessary for effectively stabilizing a neoprene latex, the quantities of these two stabilizing agents which may be added may vary over a wide range. It is desirable, however, to employ at least about four parts, preferably four to seven parts of casein, and at least about two parts, preferably two to four parts, of "Vinsol Resin" soap. The foregoing proportions are based on 100 parts of neoprene (dry weight) in the latex. Greater quantities of casein or "Vinsol Resin" soap, or both, may be employed but these increased quantities while not affecting the latex per se tend to decrease the strength of flooring and coating compositions prepared from the stabilized latex.

In preparing a flooring or coating composition employing the stabilized neoprene latex as a base, Lumnite cement and a finely divided filler, such as sand, are added directly to the stabilized latex and thoroughly mixed therewith. Lumnite cement (aluminous cement) is prepared from limestone and bauxite and is said to consist essentially of alumina ($Al_2O_3$) 40%, lime (CaO) 40%, iron oxides 15%, and other materials 5%. In the presence of an aqueous medium, Lumnite cement absorbs water and eventually attains a rigid set. The Lumnite cement and filler for best results, therefore, should be added to the stabilized latex at about the time the flooring and coating composition is to be applied. Generally speaking, the flooring and coating composition prepared with our stabilized neoprene latex compound should contain about 20 to 30% Lumnite cement, 50 to 75% sand and 10 to 20% neoprene latex. It will be apparent, however, that these percentages may be varied depending upon the properties desired in the finished product.

The following specific examples will serve to afford a more complete understanding of our invention. These specific embodiments are intended, however, merely by way of illustration and the invention is not limited thereto.

*Example A*

This example illustrates a stabilized neoprene latex prepared in accordance with the invention.

| Components | Weight (Dry) | Total Weight |
|---|---|---|
| Neoprene Latex | 100 | 200 |
| Casein (as caseinate) | 4.5 | 39.8 |
| Beta-naphthol | 0.2 | 0.2 |
| "Agerite Powder" Paste | 1.5 | 3.0 |
| Zinc Oxide Paste | 5.0 | 10.0 |
| Vinsol Resin potassium soap | 3 | 27.0 |

In the above composition the beta-naphthol is present as a preservative for the casein. Other well-known preservatives for proteinaceous material may, of course, be employed. "Agerite Powder" paste is an aqueous dispersion of "Agerite Powder," a proprietary anti-oxidant comprising phenyl-beta-naphthylamine. Zinc oxide paste is an aqueous dispersion of zinc oxide which functions as a curing agent for the neoprene. The "Agerite Powder" and zinc oxide are added to the latex in paste form in order to facilitate blending with the latex.

As previously mentioned, the casein is suitably added to the neoprene latex as the potassium caseinate, which may be prepared by swelling dry casein in water at 140° F. and then adding a 45% solution of potassium hydroxide in which the beta-naphthol has been dissolved. The mixture is stirred for a few minutes and then diluted with cold water.

Preferably, the caseinate solution is added to the neoprene latex first. The zinc oxide paste and the "Agerite Powder" are then added to the latex followed by the "Vinsol Resin" soap.

The "Vinsol Resin" soap may be prepared in the following manner: 2.7 parts of dry "Vinsol Resin" in pulverized form are stirred in 23.4 parts of cold water for about five minutes and then 0.9 part of a 45% solution of potassium hydroxide is added to the water. Complete saponification is obtained readily without heating by stirring the solution vigorously for about five minutes. The thus prepared "Vinsol Resin" soap is then added to the neoprene latex, containing the caseinate prepared as above described, and the entire composition is stirred for about ten minutes. A stabilized neoprene latex prepared as described will have a pH within the range of about 11.5 to 13.0 and a viscosity of 200 to 800 centipoises.

*Example B*

This example shows the preparation of a flooring and coating composition employing the stabilized neoprene latex described in Example A.

To 100 parts (wet weight) of the stabilized neoprene latex are added 167 parts of Lumnite cement and 375 parts of sand of about 60 mesh size and the materials thoroughly mixed until a homogeneous mixture is obtained. When the neoprene latex compound, the Lumnite cement and sand are mixed, a uniform trowellable mixture is obtained which may be trowelled immediately without further dilution or treatment. If the composition is to be sprayed it should be diluted, as by the addition of about 25 parts of water. When larger quantities of Lumnite cement and/or sand are employed per 100 parts of neoprene latex compound, additional water must generally be added to give the mixture the desired consistency.

The flooring and coating composition prepared as described hereinabove has a greyish color. If desired, colors may be imparted to the composition by the addition to the stabilized latex, of suitable pigments, which are commercially available in dispersion form suitable for addition to neoprene latices.

While the particle size of the sand or other finely divided filler employed may vary over a wide range we have found that a filler of about 60 mesh size is particularly suitable.

When Lumnite cement and sand are added to an ordinary neoprene latex, the neoprene particles agglomerate almost immediately and form a rubbery mass entirely unsuitable for flooring or coating purposes. When, however, the neoprene latex is stabilized according to our invention by the addition thereto of casein and "Vinsol Resin" soap, a neoprene latex compound is obtained which is stabilized against coagulation by Lumnite cement and sand. It may be satisfactorily mixed with these materials to form a smooth, trowellable and sprayable composition suitable for application to wood, concrete, metal or the like. The composition forms a resilient, fireproof surfacing suitable, for example, for surfacing industrial floors, runways of airports and as underlayment for other floor coverings such as tile and linoleum.

It will be apparent that various changes and modifications may be made without departing from the scope of the invention as defined in the appended claims and it is therefore intended that the foregoing shall be interpreted as illustrative and not in a limiting sense.

We claim:

1. A flooring and coating composition comprising a stabilized polymerized chloroprene latex, mineral filler and aluminous cement, said latex containing as stabilizers therefor casein and saponified liquid-paraffin - hydrocarbon - insoluble, aromatic-hydrocarbon-soluble, resinous extract of pine wood.

2. A flooring and coating composition comprising a stabilized polymerized chloroprene latex, mineral filler and aluminous cement, said latex containing as stabilizers therefor at least about 4 parts of casein and at least about 2 parts of saponified liquid-paraffin-hydrocarbon-insoluble, aromatic-hydrocarbon-soluble, resinous extract of pine wood per 100 parts of neoprene in said latex.

3. A flooring and coating composition comprising about 10 to 20% of a stabilized polymerized chloroprene latex, 50 to 75% sand and 20 to 30% aluminous cement, said latex containing as stabilizers therefor at least about 4 parts of casein and at least about 2 parts of saponified liquid-paraffin-hydrocarbon-insoluble, aromatic-hydrocarbon-soluble, resinous extract of pine wood per 100 parts of neoprene in said latex.

4. A coating composition comprising an aluminous cement admixed with a stabilized polymerized chloroprene latex containing as stabilizers therefor casein and saponified liquid-paraffin-hydrocarbon-insoluble, aromatic-hydrocarbon-soluble, resinous extract of pine wood.

RICHARD H. CUBBERLEY.
CHARLES E. DILL.

REFERENCES CITED

The following references are of record in the file of this patent:

UNITED STATES PATENTS

| Number | Name | Date |
| --- | --- | --- |
| 2,114,393 | Lane | Apr. 19, 1938 |
| 2,155,141 | Maters et al. | Apr. 18, 1939 |
| 2,193,026 | Hall | Mar. 12, 1940 |
| 2,424,813 | Gegner | July 29, 1947 |
| 2,429,223 | Eustis et al. | Oct. 21, 1947 |
| 2,487,746 | Wood et al. | Nov. 8, 1949 |

FOREIGN PATENTS

| Number | Country | Date |
| --- | --- | --- |
| 405,296 | Great Britain | Jan. 29, 1934 |
| 554,274 | Great Britain | June 28, 1943 |
| 578,304 | Great Britain | June 24, 1946 |

OTHER REFERENCES

Bennett's Concise Chemical and Technical Dictionary, Chemical Publishing Co., 1947, page 32.